Aug. 7, 1951  F. L. MICHAELS  2,563,182
PARKING METER MECHANISM
Filed Jan. 21, 1949  2 Sheets-Sheet 1

INVENTOR.
Frank L. Michaels
BY Murray Sackhoff & Murray
attys.

Aug. 7, 1951  F. L. MICHAELS  2,563,182
PARKING METER MECHANISM
Filed Jan. 21, 1949  2 Sheets-Sheet 2

INVENTOR.
Frank L. Michaels
BY

UNITED STATES PATENT OFFICE 2,563,182

PARKING METER MECHANISM

Frank L. Michaels, Fort Thomas, Ky., assignor to The Michaels Art Bronze Company, Covington, Ky., a corporation of Kentucky Application January 21, 1949, Serial No. 72,014

10 Claims. (Cl. 194—61)

The present invention relates to parking meter mechanism of the type shown and described in my prior U. S. Patents Nos. 2,397,878 and 2,311,242 and has for its principal object the provision of a mechanism of this kind which is simplified and at the same time is of enlarged utility to both the manufacturer and the purchasing municipalities because either of them may quickly adapt the mechanism to serve the wide variety of operational requirements demanded by the many different metered parking ordinances.

Another object of the invention is to provide a parking meter having a counter actuating mechanism that remains accurate in its operation despite abusive or attempted illegal operation by the motorist.

Still another object of the invention is to provide a meter mechanism that is adjustable to an exceptionally large number of specific operational requirements, most of which may be effected in the field in a simple and rapid manner without requiring dismantling of the mechanism.

A further object of the invention is to provide an improved setting mechanism for a parking meter of this kind.

A still further object of the invention is to provide an arrangement in a meter of this type that may be modified with a minimum of cost or effort to operate on selected numbers and denominations of coins.

These and other objects are attained by the means described herein and illustrated in the accompanying drawings in which.

The meter of the present invention embodies modifications of and improvements over my prior patented devices as set forth in said U. S. Patents Nos. 2,311,242 and 2,397,878, while retaining the previous general construction, appearance and manner of manipulating the device.

The overall advantages of the new mechanism include the ability of a municipality to utilize the same device to suit changes in parking regulations that would otherwise require a different model of parking meter that in some cases would be produced by a different manufacturer and thus be confusing to motorist and to maintenance personnel. Accumulated experience with parking problems, in larger cities particularly, and other considerations often suggest beneficial changes in the details of parking regulations, but the limited adaptability of most of the known parking meters does not afford the ready ability to adopt such changes. My aforementioned patented meters permit of some adjustment and inexpensive alterations whereby they may selectively serve as any one of several different models of parking meters.

The improved meter of the present invention retains the advantages of my prior meter, and also the general appearance, mode of manipulation and many of the parts thereof, particularly the casing, indicator hand, clockwork and violation signal. The details of the latter parts that are relatively unimportant to the understanding of the present invention are largely omitted herein. There are differences in the various ordinances regulating metered parking in the various urban communities. There are differences as to the coin or coins that may be used in the meters, and in the permitted time periods to be had from the proper operation of the meter. The ordinances are sometimes a compromise between stated desirable regulations and the operational limitations in the available meters. Proposed changes of ordinances that would entail new meters or specially constructed meters are usually abandoned for obvious reasons.

The present mechanism hereinafter described is selectively convertible into any of a large number of different models of parking meters. All models are produced by easy adjustments or by limited alterations and inexpensive substitutions made by the manufacturer or by the routine supervising personnel of the municipality in the field. The costs involved are generally negligible.

Referring now to the drawings, the removable casing member 10 has the entire operating mechanism assembled on its inner face and has the external manually operable handle 11 nested about an external drilled boss 12 on casing member 10.

Main shaft 13 is journaled adjacent one end in drilled boss 12 and has a terminal shouldered portion 14 of reduced diameter entered into a hole in the center of handle 11 and rigidly secured therewith as by silver soldering at 15—15.

Rigid posts 16 and 17 on the inside of member 10 support a brace 18 held thereon by nuts 19—19. A bore 20 in brace 18 rotatably supports the inner free end of shaft 13, and an integral upright 21 on brace 18 supports a violation signal mechanism (not shown) constructed and operable as shown in my aforesaid prior Patent No. 2,397,878.

Figure 2:
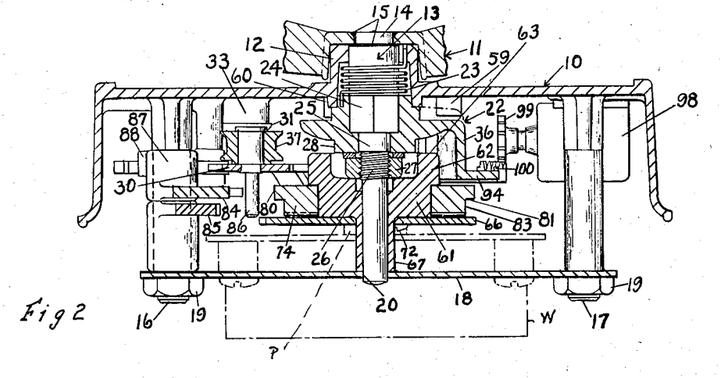
Fig. 2 is a cross sectional view taken on line 2—2 of Fig. 1.

An improved pusher disc 22 is fixed with shaft 13 adjacent the inner end of boss 12 and a coil spring 23 surrounds the shaft within the boss and has its opposite ends respectively entered into holes in said boss and disc respectively for yieldingly resisting manual rotation of the shaft by the handle 11. Disc 22 has an angular center opening that fits an angular portion 24 on shaft 13. The shaft 13 has a reduced cylindrical portion 25 that passes through a corresponding center bore in disc 22 and beyond it said shaft is threaded at 26 for the reception of a lock washer and a nut 27 which hold the parts in assembled relation as shown in Fig. 2.

Disc 22 has a narrow hub 28 of predetermined diameter against which deposited coins C (Fig. 1) may abut in edgewise relation as they drop from the lower or discharge end of a coin chute 29 which chute is supported on the inside of casing section 10 in the manner described in my prior patents.

A latch lever 30 has an axially bored and externally grooved hub 31 fixed on one face thereof intermediate its ends and a pivot screw 32 serves to rockably mount the latch lever 30 on the end of a boss 33 on the casing member 10 so that the free end 34 of said lever may rock toward and away from shaft 13 in a plane alongside coin chute 29 and the hub 28 on disc 22.

The upper end 34 of latch lever 30 normally extends into the path of the leading end 35 of an arcuate segmental flange 36 on the face of disc 22, and thus prevents an effective degree of rotation of disc 22 by means of handle 11 until said end of the latch lever is moved out of the path of flange 36. On one face of lever 30, intermediate the end 34 and the pivotal mounting screw 32, is a roller 37 having a groove therein opposed to the hub 28 on the disc. A fixed post 38 has a tension spring 39 hooked thereto at one end, while the other end of the spring is hooked on a projection 40 on the lower and laterally offset portion 41 of lever 30 and thus yieldably urges the lever in a clockwise direction about its pivot 32 until the edge 410 of the lever 30 meets the edge 42 of a pawl hook 43 which is pivoted on post 38. When pawl hook 43 assumes the position shown in Fig. 1 it serves as a positive stop for latch lever 30 and in the then position of lever 30, the grooved roller 37, near the upper end of the lever, cooperates in holding a deposited coin C of selected size at rest in the path of the end 35 of flange 36. On manual operation of handle 11 the shaft and disc will turn and cause the end 35 of the flange to contact the upper periphery of coin C which extends higher than the end 34 of the lever. The manual pressure thus exerted on the edge of the coin is thus transmitted to roller 37 and serves to rock the latch lever 30 in a counterclockwise direction about pivot 32 against the resistance of spring 39 and thus remove the end 34 of the lever out of the path of the flange 36 as the end 35 of said flange continues to push the coin past the centers of hub 28 and roller 37.

Figure 1:
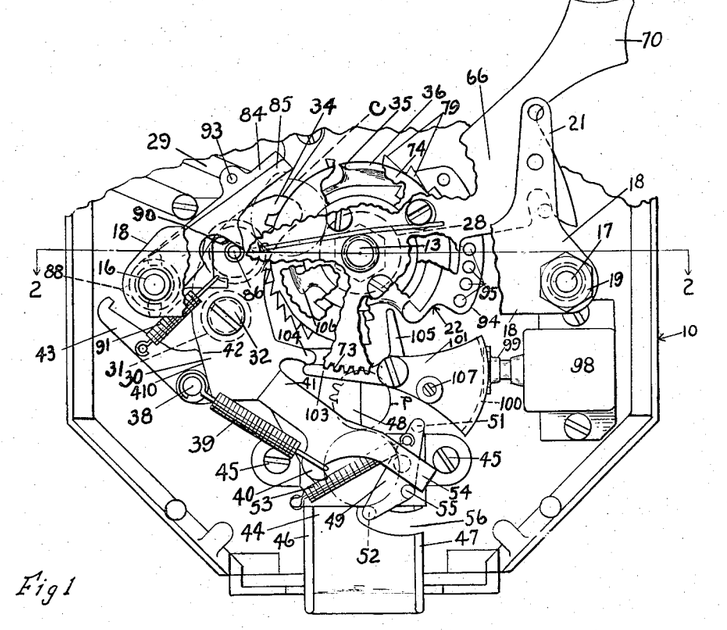
Fig. 1 is an elevational view of the improved mechanism, arranged as a one-hour meter, parts being broken away.
Figure 5:
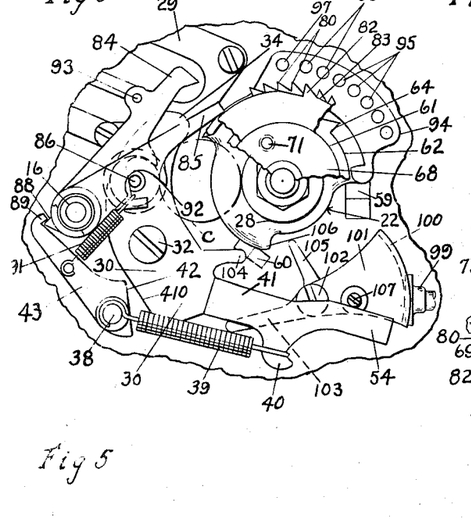
Fig. 5 is a view similar to Fig. 3 but showing the parts adjusted to operation as a two-hour parking meter, and a nickel passing therethrough during manual operation.

As can best be seen in Figs. 1 and 5 the coin C is moved through an arc following the periphery of hub 28 on the pusher disc 22 so that when the coin leaves the roller 37 it will be guided by the grooved hub 31 of lever 30 during gravitational descent and directed edgewise into the open top of a discharge channel member 44 that is fastened on the casing section 10 by means of screws 45. The channel member 44 has angularly related side walls 46 and 47 on the upper portion of which is supported a transverse cover plate 48 that is thus spaced from the inside face of the channel to permit passage of a coin between them as the coin drops guidedly from hub 31.

Figure 3:
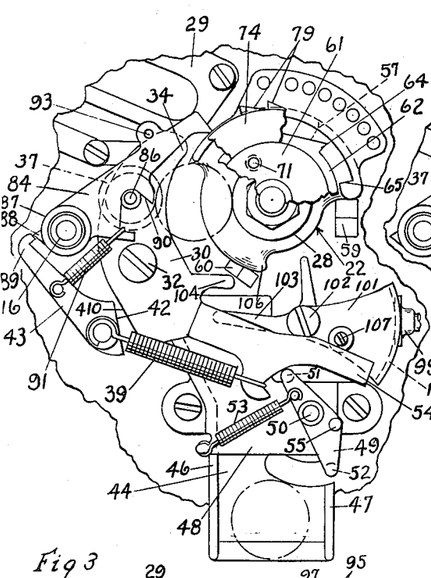
Fig. 3 is an enlarged fragmental elevational view of the mechanism of Fig. 1, the indicator and the nickel pawl being removed, and showing a penny at the beginning of its movement through the meter under manual operation.
Figure 4:
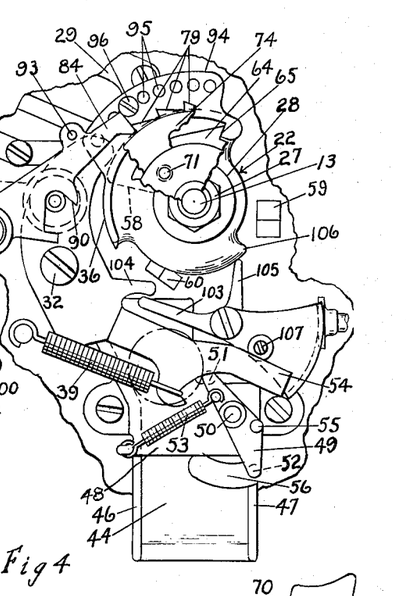
Fig. 4 is a view similar to Fig. 3, but showing the parts at the completion of the manual operation.

On the outer face of cover plate 48 is a triangular coin control member 49, which is rockably mounted on an upstanding pin 50. Member 49 has a pin 51 fixed on the upper corner thereof and extending across the upper edges of channel 44 and its cover plate 48 and said edges serve to limit rocking movement of the control member 49 in one direction as shown in Figs. 3 and 4 wherein pin 51 serves to arrest a falling coin (see Fig. 4). A corresponding pin 52 extends from the lower corner of member 49 and extends across the space between the channel and its cover to alternately arrest and release coins that were previously arrested and released by pin 51. (See Figs. 1 and 3.) A spring 53 biases member 49 to the position shown in Figs. 3 and 4 but member 49 is normally urged to its opposite limit by an integral arm 54 formed by the end of offset 41 of latch lever 30 which engages an upstanding pin 55 on member 49 and rocks the latter by the superior tension of spring 39 to the position shown in Fig. 1. The channel 44 is arcuately slotted at 56 to accommodate movement of pin 52 to engagement with the bottom edge of cover plate 48 as a stop. The casing section 10 has a coin inspection window (not shown herein) as illustrated in my prior Patent No. 2,397,878 so that a coin resting on pin 52 (Fig. 1) may be seen from the exterior of the meter to reveal the character of the coin or slug last used for setting the meter.

The foregoing described structure controls the passage of deposited coins through the meter from coin chute 29 with the manual operation of pusher disc 22 serving to rock latch lever 30 aside for a distance that corresponds to the diameter of the coin. The movement of latch lever 30 also lifts the lower integral arm 54 thereof and allows coin control member 49 to move under the influence of its spring 53 to the position shown in Fig. 3 so that pin 52 will release a previously held coin for discharge from chute 44 into a suitable coin receptacle (not shown) while the coin in the meter is still under the control of the hub 28, roller 37 and the end 35 of the flange 36 on the pusher disc. When released from the latter position the coin is retained as shown in Fig. 4 until the handle 11 is released, whereupon the coin control member is instantly shifted to the position shown in Fig. 1 by the spring returned movement of arm 54. The coin when released by pin 51 is arrested and retained by pin 52 until another coin is passed through the meter.

The disc 22 is limited to approximately 180° of manual rotation from the position shown in Fig. 1 and when the handle 11 is released the disc is returned by spring 23 to said illustrated position. Positive limit stops are provided by opposite faces 57 and 58 of a sector shaped lug on disc 22 which faces are adapted to abut lugs 59 and 60 respectively on the casing section 10. In the absence of a coin, the end 34 of latch lever 30 blocks the manual movement of the disc against any effective degree of rotation.

As mentioned heretofore the present mechanism is particularly designed to retain the appearance and general mode of manipulation of my prior patented parking meter as shown in my U. S. Patent No. 2,397,878 so that a motorist may utilize the new mechanism in a familiar manner and still be regulated according to any selected conditions that may be imposed by adjusting said mechanism to function as a selected model parking meter suited to the conditions.

In order to realize all of the improved and enlarged functions of the mechanism there is provided a sleeve member 61 that is mounted for free rotation on the main shaft 13 and has its end play strictly limited between the inside face of brace 18 and the top face of nut 27 which holds disc 22 on shaft 13. An offset annular flange 62 of increased external diameter is formed integrally on the sleeve 61 and the face 63 of said flange (see Fig. 2) lies in approximately the same plane as the end face of hub 28 and assists in positioning a coin in edgewise abutment on said hub. A single peripheral tooth 64 on flange 62 lies in the path of an inturned hook 65 on the trailing end of segmental flange 36 of disc 22 so that when the disc is rotated the hook 65 will engage tooth 64 and rotate the sleeve.

Figure 6:
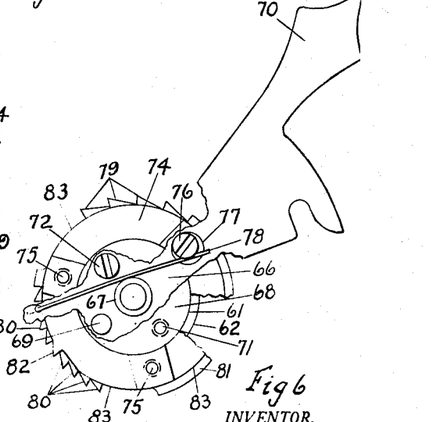
Fig. 6 is a fragmental elevational view of the indicator hand and the sleeve member with its adjustable toothed ring forming a detail of the invention.

As can be best seen in Figs. 1, 2 and 6, an indicator element 66 is perforated to pass over the reduced tubular end 67 of sleeve 61 into abutment with the major end face 68. An integral boss 69 on end face 68 is received in a corresponding hole in indicator member 66 so that the hand 70 on the latter assumes a predetermined radial adjustment with respect to tooth 64 on flange 62 of the sleeve. Threaded bores such as 71 in the face 68 of the sleeve threadedly receive screws 72 that pass through indicator member 66 and removably secure it for movement with said sleeve.

The indicator member 66 is arranged as in the aforesaid prior Patent No. 2,397,878 with a series of gear teeth 73 (see Fig. 1) which are engaged with a pinion P of a clockwork W (not detailed) and whereby the clockwork is wound as the indicator is manually moved through the handle 11, disc 22 and sleeve 61, and which thereafter permits the clockwork to return the indicator member to its starting or zero position in accordance with the passage of time as measured on a suitably graduated dial strip (not shown) that is fixed adjacent the path of the end of hand 70.

The maximum range of movement of hand 70 is perhaps slightly more than 90° and the dial strip over which it passes is graduated to represent a total of one, two, five or ten hours, each subdivided into tenths for convenient reading. The clockwork (not detailed) is in each instance geared to drive the indicator hand across the dial in the period of time represented on the dial. The companion dials and clockworks are easily interchangeable without dismantling the assembled mechanism. The hereinafter described control of the indicator setting mechanism operates without imposing a load on the drive of the clockwork so that the clockwork used to effect the different models of meters distinguish only in the speed at which the final drive pinion operates.

For the purpose of attaining selective degrees of indicator setting for insuring operation of the meter for corresponding periods of time, there is provided a toothed setting ring 74 which is rotatably mounted on the sleeve 61 between the flange 62 thereof and the indicator member 66. The toothed ring 74 has in its face tapped bores 75, spaced 120° apart and these are selectively adapted for the reception of a threaded stop pin 76 that is passed through a hole 77 in indicator member 66. Hole 77 is of appreciably greater diameter than pin 76 so that a limited degree of relative rotation of the toothed ring on sleeve 61 is possible. A straight spring element 78 is anchored at one end in indicator member 66 and extends past the tubular extension 67 against which it bears. The free end of spring element 78 is flexed and entered alongside pin 76 to normally resist the limited lost motion of the toothed ring 74 relative to the sleeve and the indicator member 66 thereon.

The toothed ring 74 has extending about its periphery several sets of teeth, one set of four teeth providing five engaging surfaces 79 beginning at the tapped bore 75 in which the stop pin 76 is mounted (Fig. 6) and another set of nine teeth providing ten engaging surfaces 80 beginning at the next tapped bore 75. The remaining portion 81 of the periphery beyond the third tapped bore 75 is usually left blank so that special teeth may be cut therein if and as desired for adapting the mechanism to selected different coins or different numbers of coins. The toothed ring 74 has the center tooth 82 of the series of teeth 80 extending across its entire width, the periphery of the ring being otherwise shouldered or reduced to a lesser diameter for a distance of one half the thickness of the ring as indicated at 83.

Mounted one beneath the other on post 16 as a support pivot, are coin stop pawls 84 and 85, the end of the former being adapted to be lowered into the path of the series of teeth on ring 74, while the end of stop pawl 85 may be lowered to ride circumference 83 and becomes operative only on the extended portion of tooth 82 of the series of teeth 80 when the ring 74 is adjusted to the position shown in Fig. 5. Both of these pawls are effective when the meter is arranged to utilize large and small diameter coins (e. g. pennies and nickels) to yield proportionate time settings in a two hour meter (see Fig. 5).

The latch lever 30 has a pin 86 projecting from one face thereof into the path of the two coin stop pawls 84 and 85, the said pin 86 extending entirely through lever 30 and serving as a means for rotatably mounting the grooved roller 37 coaxially with the pin. Thus when latch lever 30 is rocked on its pivot 32 as a coin, such as C, is pushed from the position in Fig. 1 to the position in Fig. 3, lever 30 moves pin 86 through a short arc. Pawl 84 has an extended hub with a tooth 88 that is adapted to engage beneath the hooked end 89 of pawl hook 43 whereby said coin stop pawl 84 is latched in the inoperative position as shown in Fig. 5.

The pawl 84, as can best be seen in Figs. 1 and 3, is notched to provide a cam edge 90 that cooperates with pin 86 on lever 30 as hereinafter described. A spring 91 is connected at its opposite ends to pawl hook 43 and coin stop pawl 84 so that it yieldingly urges the end 89 of hook 43 toward engagement with tooth 88 on hub 87, and also urges the coin stop pawl 84 toward pin 86. The pawl 84 may be termed the "lesser" coin stop pawl or "penny" stop pawl. The pawl 85 may be termed the "greater" or "nickel" coin stop pawl. The pawl 85 has a somewhat deeper notch that presents a cam edge 92 that contacts pin 86 alongside edge 90 of pawl 84 when the pin 86 is in the position shown in Fig. 1. In said position the cam edges 90 and 92 on the respective pawls hold the free ends thereof elevated above the teeth on toothed ring 74. A pin 93 on stop pawl 84 extends alongside pawl 85 and both pawls thus rest on pin 86 under the influence of gravity and under the yielding resistance of spring 91 at this time.

When the lever 30 moves pin 86 toward the pawls as a penny is manually pushed through the meter, the pin 86 allows both pawls to drop slightly to substantially contact the free ends thereof with the periphery 83 and the free end of the pawl 84 will remain there to intercept the nearest tooth of the series of teeth 79 if the toothed ring 74 be adjusted according to Figs. 1, 3, 4 and 6. If the coin C is a penny (or the smaller of two predetermined coins) the maximum movement of pin 86 will be as shown in Fig. 3 so that pawl 84 will cooperate with the teeth of the series that is advanced by rotation of the pusher disc and thus arrest the toothed ring 74 and allow the sleeve 61 to advance slightly relative to said toothed ring until lost motion pin 76 overcomes spring 78 and the indicator member 66 with its hand 70 comes to a positive stop in the position shown in Fig. 4. When the manual pressure on handle 11 is released after bringing the parts to the position in Fig. 4, release of the handle allows sleeve 61 and the attached indicator member 66 to remain in the advanced position to be slowly returned in accordance with the passage of time under the influence of the clockwork (not shown). However the release of the handle 11 allows pusher disc 22 and the handle to return instantly to starting position (Fig. 1) under the influence of the handle spring 23, and as the arcuate outer face of flange 36 is withdrawn from the edge of latch lever 30, the lever 30 is returned to the position shown in Fig. 1 by the action of spring 33. Said movement of lever 30 causes pin 86 thereon to shift along edges 90 and 92 of the pawls 84 and 85 and raise pawl 84 out of the path of the abutting face of tooth 79 whereupon the tension of spring 78 now advances toothed ring 74 beyond the point where it had been positively stopped by the penny pawl 84. It will be seen that if the mechanism is again manually operated (forthwith or within a few minutes) using another deposited penny, the pawl 84 will drop on the top of the tooth last engaged and the advance of the parts will be arrested by the succeeding tooth of the series 79 on toothed ring 74. The motorist thus may use one, two, three, four or five pennies successively to set the indicator hand 70 proportionately up to the maximum setting permitted.

As an alternative the motorist may deposit a nickel and advance the indicator hand 70 to the maximum setting. The movement of a nickel coin C' through the meter under the manual movement of the pusher disc 22 causes the latch lever to move further away from the hub 28, due to the greater diameter of the coin, and in so moving the pin 86 initially cooperates with the cam edges 90 and 92 allowing both pawls 84 and 85 to drop to the periphery of toothed ring 74, but as said pin continues to move, beyond the position shown in Figs. 3 and 4, to the position shown in Fig. 5 its engagement in the top of the notch now exerts a lifting action on pawl 84 so that tooth 88 on the hub 87 thereof is positively engaged in the hooked end 89 of pawl hook 43 and is held by said hook under the influence of spring 91 until the disc 22 is spring returned, after release of the handle 11, until the end 35 on the disc is retracted from path of the end 34 of the latch lever. The penny stop pawl 84 thus remains latched in an elevated, inoperative position during the manual setting operation. The nickel stop pawl 85 merely rides on the smooth circumference 83 allowing the setting of the indicator 70 to the maximum if the toothed ring 74 is adjusted as shown in Figs. 3 and 4. The showing of coin stop pawl 85 is omitted in said views and the said pawl may in fact be omitted when the toothed ring 74 is in the adjusted position as shown therein, namely when the meter is a one hour type.

When a two hour meter is required a slower drive from the clockwork will move indicator hand 70 through the same arc of approximately 90° and the dial strip is correspondingly graduated. The threaded stop pin 76 is removed from its position at the end of teeth 79 of toothed ring 74 without dismantling the assembly shown in Fig. 1. The toothed ring is now rotated on its mounting through 120° and pin 77 is inserted in the tapped hole 75 at the end of the ten tooth series 80 and the tension spring 78 is then readjusted behind the pin.

Coin stop pawl 84 will now cooperate with each of the ten teeth 80 if a succession of operations is made on inserted pennies, and a maximum of two hours prepaid parking time may be had.

If the hand 70 is in the zero position and the handle 11 is operated to operate disc 22 on an inserted nickel the pawl 84 operates as previously described assuming an inoperative elevated position, while the nickel stop pawl 85 rides the circumference 83 of toothed ring 74 until the single tooth 82 abuts it to stop the indicator half way between its limits to yield a one hour setting of the meter. If the handle 11 be released the mechanism becomes normalized, and as the nickel stop pawl is raised, the tooth 82 moves slightly forward under the influence of spring 78 on pin 77. The operation of the meter forthwith on a second deposited nickel will therefore cause nickel stop pawl to descend on top of elongated tooth 82 and permit further advancement of the indicator hand 70 to the two hour limit.

In some localities it is desired to permit the motorist to obtain prorata settings of the meter (regardless of the model) for the deposited coin. In other localities it may be desirable to allow the use of less than the full number of pennies, to enable the pennies to serve for partial setting of the meter, permitting legal parking while the motorist secures suitable coins to complete the desired setting. For this purpose the present mechanism has a segmental wing 94 with tapped holes 95 to selectively receive, if desired, a threaded pin 96 which overhangs the path of the sets of teeth and will thus positively abut the end of coin stop pawl 84 and limit manual movement of pusher disc 22 by its handle 11 and render inoperative any teeth in the series that might otherwise be effective for further setting of the indicator hand 70 in a forward direction. (See Fig. 4.) If it be desired to completely exclude the effective use of pennies and permit operation of a meter on nickels only the pin 96 would be located in tapped hole 97 located in advance of the holes 95. It will be remembered in this connection that whenever the meter is manipulated with a deposited nickel, the pawl 84 is raised sufficiently by the movement of pawl 85 so that the pin 96 is always cleared, along with any of the teeth, by the penny pawl 84. If pennies are inserted and the pin 96 is in hole 97, said pin moving, under the manual operating impulse, will abut the end of pawl 84 before the hook end 65 picks up the tooth 64 and move it from its initial position. When the pin 96 is located in any of the holes 95 it will abut the pawl 84 before hook 65 picks up the tooth 64 as advanced by operation on previous insertion of pennies up to the predetermined amount. The provisions of arbitrary limitations on meters in selected congested areas by the use of pin 96 tends to discourage short time parking where the free flow of traffic is interrupted by movement of vehicles to and from the parking berths along the way. It will be noted that holes 95 are spaced to correspond with the spacing of teeth 80 on ring 74 hence if the pin 96 is employed when the ring 74 is adjusted as in Fig. 4 the alternate holes 95 are employed since the abutment faces of the series 79 of the teeth are numerically half that of the abutment faces of series 80 and the individual teeth 79 are twice as long as the individual teeth 80.

In my aforementioned prior patented parking meters, coins of two predetermined diameters and having proportionate values of 1 to 5 are selectively used in the meters. They automatically operate a counteractuating mechanism whereby a simple counter device accumulates a total, showing at all times the total value of all coins passed through the meter in units representing the lesser denomination of coin. The automatic advancement of the counter in the prior meters is dependent for its accuracy on the factor of the difference in diameter of the two permitted coins hence very accurate adjustment is required. The so termed oversized and undersized coins of these denominations sometimes caused inaccurate actuation of the counter. Moreover if a motorist used an illegal and skillful violence in operating the meter handle he could sometimes succeed in causing improper actuation of the counter while using the smaller diameter coin.

Due to the improved and different specific arrangement of the setting mechanism of the present invention it has been made possible to operate a mechanically simpler counteracting mechanism which accomplishes the desired results of my prior patented device without depending on the diameters of the coins for accuracy of operation.

The improved arrangement utilizes a simple counter device 98 mounted on casing section 10 as in my prior patents (see Figs. 1 and 2). The counter pinion 99 is in constant mesh with the teeth 100 of an arcuate rack or face gear segment formed on one end of an operating lever 101 that is pivoted intermediate its ends by a screw 102 passing therethrough. The end of lever 101 is developed into an arm 103 which lies in a common plane with and sometimes in the path of an integral finger 104 on the main body of the rockable latch lever 30 and the said lever 101 and its arm 103 are movable alongside the offset portion 41 of the latch lever 30. The counter operating lever 101 has an integral finger 105 which is offset to operate in the plane of disc 22, which disc is peripherally cut away for a distance from the trailing end of flange 35 to provide a clearance within which the end of finger 105 may swing as the lever 101 is rocked on its pivot 102. A rounded cam nose 106 at the end of the clearance in the disc is adapted, on rotation of disc 22 in pushing a coin through the meter, to engage finger 105 in whatever position the latter may be and move it to the position shown in Fig. 3. In so doing the arcuate rack teeth 100 are moved downward and actuate the counter. Any further manual movement of disc 22 simply allows the periphery of disc 22 to travel past the end of finger 105. When the handle 11 is released the disc 22 is spring returned and it permits the latch lever 30 to return to the normalized position shown in Fig. 1 under the influence of spring 39. During the latter movement of lever 30 the finger 104 thereon engages the arm 103 of counter operating lever 101 and pushes it downwardly which causes the opposite end of lever 101 to rise for a distance of one of its teeth 100 to the position illustrated in Fig. 3. The rack or gear segment is thus always brought accurately to rest in position to cause it to advance the counter pinion 99 one tooth and register one unit on the counter when the disc 22 is manipulated after deposit of a succeeding coin. If said succeeding coin is a penny the latch lever 30 is rocked as hereinbefore described from the position shown in Fig. 1 to the position shown in Fig. 3 wherein the terminal arm 54 at the lower end of lever 30 approaches approximate contact with a pin 107 extending from counter operating lever 101. Since lever 101 has already been automatically set to cause the counter to register one unit, it matters not if the penny be slightly undersize or oversize since the variation in diameter will not vary the movement of arm 54 sufficiently to push the pin 107 enough to lift the lever a full tooth on the rack 100. Moreover no forceful operation of the disc cam set up troublesome momentum in the movement of latch lever 30 during this interval, since the disc is pushing the coin against the resistance of spring 39. Falst setting of the counter actuating lever is thus impossible and the effective operation on the counter thereafter is also positive.

If a nickel is passed through the meter it will impart a greater degree of rocking movement to latch lever 30 and cause the arm 54 thereof to lift pin 107 and thereby move lever 101 to the position shown in Fig. 5 thereby advancing the arcuate rack or segmental gear 100 four additional teeth beyond its previous automatic setting of one tooth (as shown in Figs. 1 and 3). The finger 105 on lever 101 is thus positioned to be engaged earlier in the rotation of the disc and moved to the limit shown in Fig. 4 by the cam nose 106 on the disc 22, at which limit the rack 100 will have advanced the counter five units because the rack will have been moved exactly five teeth past the counter pinion 99. The spring return of disc 22 again allows latch lever 30 to set the rack up one tooth as finger 104 meets the arm 103 on the lever 101.

The operation of the meter by the motorist will be well understood as identical with that of the prior patented meter and need not be repeated in detail. The motorist selectively deposits a penny or a nickel, turns handle 11 until it is stopped by the abutment of one of the teeth on ring 74 and then releases the handle. The manual movement sets the indicator hand 70 and winds the clockwork (not shown) it also operates the counter-actuating mechanism as described herein.

All of the adjustments or substitutions of parts adapting the mechanism to serve as different models of parking meters are easily and quickly made in the field without dismantling the assembly on the casing section 10. In those instances requiring special limitations as to the number of coins and relative values the manufacturer may supply a toothed ring 74 wherein the necessary teeth are cut in the portion 81 thereof. The diameter of hub 28 on the disc 22 may be larger or smaller than shown to accommodate the meters to different pairs of predetermined coins. The cost of providing meters to suit any of a very great variety of specific requirements is thus reduced to a true minimum both as to production of parts and as to assembly.

The timing operation when the meter is wound proceeds while the coin stop pawls are held free of the toothed wheel, hence the clockwork may operate accurately without detrimental load, and long term parking periods (e .g. 10 hours) are made entirely feasible.

What is claimed is:

1. In a parking meter mechanism the combination of means for successively arresting deposited coins at one position, a manually operable spring returned pusher for successively displacing the arresting coin and thereby shifting the coin arresting means, spring means yieldably urging the coin arresting means to a coin arresting position, a pawl hook pivoted for movement in the plane of the coin arresting means and having a flat edge at its pivoted end serving as a stop for the coin arresting means in its last named position whereby the pawl hook is pivotally shifted into inoperative position as a hook, a pin forming an extension of the coin arresting means, a coin stop pawl pivoted at one end and having a tooth at said pivoted end for engagement by the hook end of said pawl hook, a tension spring yieldably urging the pawl hook and the coin stop pawl about their respective pivots in a common direction urging the pawl toward said pin and shifting said tooth thereon slightly beyond engaging position with the pawl hook, said pawl having a notch forming a cam surface in the edge thereof normally riding on the pin whereby the coin stop pawl is sustained in elevated position when the coin arresting means is in coin arresting position, shifting of the coin arresting means against the resistance of its spring permitting initial lowering of the coin stop pawl as the cam edge thereof rides on said pin, continued movement of said pin with the coin arresting means serving to elevate the coin stop pawl above its initial position whereby the tooth on the pivoted end of the coin stop pawl is engaged and retained by said pawl hook, a sleeve engageable for rotation by the pusher during manual operation thereof, an indicator member fixed on the end of the sleeve, a toothed ring rotatably supported on the sleeve and having a yieldable lost-motion connection with said indicator, the teeth on the ring being disposed in a plane with the coin stop pawl, the free end of the coin stop pawl being normally elevated out of the path of said teeth and coacting with the teeth only during the initial lowering of the pawl with said pin.

2. In a parking meter mechanism the combination of a casing, a manual rotatable spring returned shaft therein, a pusher disc fixed to the shaft, a sleeve rotatable on the shaft and adapted for deferred engagement by the disc during manual rotation of the latter from its spring returned position, an indicator member secured on the end of the sleeve and adapted for constant meshed engagement with a clockwork for alternate winding of and return by the latter, a latch lever pivoted intermediate its ends alongside the disc, a projection on one face of said lever for arresting a deposited coin edgewise against the disc and in the path of another portion of the disc whereby, upon manual rotation of the disc, the arrested coin and the lever are displaced, a pin on the opposite face of the lever coaxial with the coin arresting projection, a coin stop pawl pivoted at one tooth-shaped end adjacent the path of movement of the latch lever and including a cam edge normally biased to ride on said pin, a toothed ring rotatable on the sleeve and having a yieldable lost-motion connection with the indicator member, a spring urged pawl hook pivoted adjacent one end thereof in the plane of the latch lever, a spring biasing the latch lever to engage with the pivoted end of the pawl hook as a positive stop whereby the free end of the coin stop pawl is held by the aforesaid cam edge and pin out of the path of the teeth on the toothed ring, shifting of said pin by initial displacement of the latch lever away from said positive stop by a coin of predetermined small diameter serving to lower the coin stop pawl permitting the free end thereof to enter the path of the teeth on the toothed ring to arrest manual movement of the sleeve and indicator by the pusher, movement of the latch lever under the influence of a coin of predetermined large diameter serving to initially lower and then elevate the free end of the coin stop pawl to a position wherein the tooth-shaped pivoted end of the coin stop pawl is engaged and held by said pawl hook under the influence of its spring until the latch lever returned under the influence of its biasing spring to positive stop abutment against the pivoted end of the pawl hook and shifts the latter pivotally to release it from the tooth-shaped end of the coin stop pawl.

3. In a parking meter mechanism the combination of a casing, a manually rotatable shaft journaled in the casing, a pusher disc fixed on the shaft interiorly of the casing, a spring yieldably urging the disc and shaft to a positive stop, said disc having a segmental arcuate flange, a latch lever pivoted intermediate its ends and having the upper end thereof normally disposed in the path of the leading end of said flange, a spring biasing the latch lever to the last named position, a spring urged pawl hook pivoted in the plane of the latch lever and serving as a limit stop to the movement of the latch lever under the influence of its biasing spring, the latch lever in the last named position serving to position the free end of the pawl hook in an inoperative position as a pawl hook, a pin extending transversely through the latch lever intermediate its pivot and the upper end thereof, a roller journaled on the pin on one side of the latch lever, a coin chute adapted to direct deposited coins to arrested position on said roller and in edgewise abutment with said disc whereby the leading end of the segmental flange may be moved against the deposited coin for rocking the latch lever on its pivot out of the path of said flange, a coin stop pawl pivoted adjacent one tooth-shaped end in the path of the free end of the pawl hook, said coin stop pawl having a notch therein providing a cam edge cooperating with the pin on the latch lever whereby rocking movement of the upper end of the latch lever under the influence of a coin of predetermined small diameter permits the coin stop pawl to lower, and when displaced under the influence of a predetermined large diameter coin to permit said pawl to lower and then raise and position the tooth-shaped end thereof for latched engagement with the pawl hook, a sleeve rotatably supported on the shaft and adapted for deferred driving engagement by the disc during manual rotation of the latter, an indicator member fixed on the free end of the sleeve, a toothed ring rotatably supported on the sleeve and having a yieldable lost-motion connection with the indicator member, the teeth on the sleeve lying in the plane with the free end of the coin stop pawl and engageable on said end when the pawl is in lowered position, a coin counter including a pinion, a counter operating lever pivoted intermediate its ends and having on its free end a curved rack meshing with the said pinion, the opposite end of said counter operating lever extending into the path of the latch lever whereby the counter operating lever is positively positioned by the latch lever on spring return movement of the latter, a finger on the counter operating lever, a cam on the periphery of the disc adapted to engage said finger on the counter operating lever for shifting the latter as the disc is manually turned with the shaft, a pin on the counter operating lever disposed in the path of movement of the lower end of the latch lever and adapted as the latch lever is shifted to its extreme position under the influence of a large coin for shifting the counter operating lever to the opposite limit.

4. In a manually operable parking meter, the combination of means for successively arresting deposited coins of predetermined large and small diameter at a common position, a manually advanced, spring returned pusher disc for engaging said coins and displacing the arresting means different distances determined by the diameter of the coin engaged, a pivoted latch lever supporting the said arresting means and rockable therewith to and from a position blocking manual operation of the pusher disc, a settable indicator yieldably urged to a zero position in accordance with the passage of time, means engageable by the pusher disc for setting the indicator away from zero position, a toothed member having limited lost-motion connection with the indicator, a pivoted stop pawl having a free end adapted for engagement successively by the abutment faces of the teeth on said toothed member and thus correspondingly limit setting movement of the indicator, cooperating means on the latch lever and pawl for elevating the free end of said pawl out of the path of the toothed member when the latch lever is in the aforesaid blocking position, and serving to lower the free end of said pawl into the path of the toothed member as the latch lever is moved under the influence of the predetermined small diameter coin and thereby limiting manual setting movement of the indicator according to a single tooth of the toothed member, movement of the latch lever under the influence of the predetermined large diameter coin serving to elevate the free end of the stop pawl above its original elevated position, a spring urged pawl hook adapted to engage and hold the stop pawl as it moves to the extreme elevated position, and permitting continued setting movement of the indicator, and cooperating edge portions on the pawl hook and the latch lever for moving the pawl hook to an unlatched, inoperative position as the latch lever returns to the aforesaid blocking position.

5. In a manually operable parking meter the combination of means to successively arrest deposited coins of predetermined large and small diameters at a common position, a rockable latch lever yieldably urged to a neutral position and carrying the coin arresting means near its upper end, a manually rotatable spring returned pusher disc adapted to be blocked against effective manual rotation by said upper end of the latch lever when the latter is in neutral position and further adapted to engage a coin on the arresting means for displacing the coin and thereby rocking the latch lever for different distances determined by the diameters of the coins engaged, a settable indicator member yieldably urged to a zero position in accordance with the passage of time, said disc arranged and adapted, on manual rotation to engage with the indicator for setting the latter away from zero position, a toothed member movable with the indicator member having a series of relatively narrow teeth adapted to successively limit the extent of setting movement of the indicator member between its zero and its maximum setting positions, the centermost of said teeth being extended to form a wide center tooth in said series adapted to arrest setting movement of the indicator member midway its zero and maximum setting positions, a small coin stop pawl and a large coin stop pawl pivoted on a common center in side by side relation and having their respective free ends adapted to enter the paths of the narrow teeth and the wide tooth on said toothed member, a pin on the latch lever, a projecting cam edge on the small coin stop pawl resting on said pin and holding the free end of said pawl above the path of said narrow teeth when the latch lever is in neutral position, the said cam edge being curved upwardly and then downwardly with respect to the path of movement of said pin during rocking movement of the latch lever, whereby said pawl may cooperate with the narrow teeth when the latch lever is moved under the influence of a predetermined small diameter coin, and on greater movement of the latch lever under the influence of a predetermined large diameter coin said small coin stop pawl is elevated above its initially raised position, a pawl hook engageable on the small coin stop pawl for holding it in the last named position, a light spring connecting said pawl and said pawl hook and yieldably urging the hook toward an operative position and urging said small coin stop pawl toward the pin on the latch lever when the pawl hook is inoperative, said latch lever in its neutral position serving to disengage the pawl hook and hold it in inoperative position, a cam edge on the large coin stop pawl resting on said pin on the latch lever in its neutral position and holding said pawl elevated above the path of the wide tooth, said cam edge being shaped with relation to the path of movement of the pin on the latch lever to permit said large coin stop pawl to decend independently of the small coin stop pawl and cooperate with said wide tooth during movement of the latch lever under the influence of a coin of predetermined large diameter, and a yieldable lost-motion connection between the toothed member and the indicator member for advancing the toothed member as said pawls are raised from the path of the teeth when the latch lever resumes a neutral position.

6. In a coin controlled parking meter the combination of a settable indicator member yieldably returned to zero position in accordance with the passage of time, a spring returned manually operable pusher disc for engaging the indicator member and moving it away from zero position toward maximum setting position, an arcuate flange on the pusher disc, a ring having a series of teeth on its periphery and having a yieldable lost-motion connection with the indicator member, a small coin stop pawl having a pivotally mounted tooth-shaped end and yieldably urged to present its free end to the path of said teeth, a rockable latch lever yieldably urged to a neutral position wherein the end of the lever blocks the leading end of said arcuate flange against effective manual rotation of the pusher disc, means on said lever for arresting deposited coins of predetermined large and small diameters in the path of the pusher disc whereby the coins are displaced and the lever is rocked for distances differing with the diameters of the coins displaced, said arcuate flange, in the manually advanced position of the pusher disc, blocking return movement of the latch lever to neutral position, cooperating cam and pin means on the small coin stop pawl and latch lever whereby the latch lever in its neutral position holds said coin stop pawl above the path of the teeth on said ring and whereby movement of the latch lever under the influence of a small coin permits the small coin stop pawl to descend into the path of said teeth, greater movement of the latch lever under the influence of a predetermined large coin serving to further elevate the small coin stop pawl above its initial position, a pawl hook yieldably urged to operative position for engaging upon the tooth-shaped end of the small coin stop pawl and holding it in its said further elevated position when the latch lever is out of neutral position, a segmental wing on the pusher disc disposed alongside the said series of teeth and having successive perforations therein spaced apart in accordance with the spacing of said teeth, a pin selectively insertable in said perforations and adapted to contact the small coin stop pawl upon predetermined rotation of the pusher disc whereby the pusher disc is positively precluded from further advancement and thereby precludes further effective operation of the pusher disc and lever under the influence of a small coin, while permitting normal operation of the pusher disc, latch lever and indicator member under the influence of a large coin.

7. In a coin controlled parking meter the combination of a settable indicator member yieldably returned to zero position in accordance with the passage of time, a spring returned manually operable pusher disc for engaging the indicator member and moving it away from zero position toward maximum setting position, an arcuate flange on the pusher disc, a ring having a series of teeth on its periphery and having a yieldable lost-motion connection with the indicator member, a small coin stop pawl having a pivotally mounted tooth-shaped end and yieldably urged to present its free end to the path of said teeth, a rockable latch lever yieldably urged to a neutral position wherein the end of the lever blocks the leading end of said arcuate flange against effective manual rotation of the pusher disc, means on said lever for arresting deposited coins of predetermined large and small diameters in the path of the pusher disc whereby the coins are displaced and the lever is rocked for distances differing with the diameters of the coins displaced, said arcuate flange, in the manually advanced position of the pusher disc, blocking return movement of the latch lever to neutral position, cooperating cam and pin means on the small coin stop pawl and latch lever whereby the latch lever in its neutral position holds said coin stop pawl above the path of the teeth on said ring and whereby movement of the latch lever under the influence of a small coin permits the small coin stop pawl to descend into the path of said teeth, greater movement of the latch lever under the influence of a predetermined large coin serving to further elevate the small coin stop pawl above its initial position, a pawl hook yieldably urged to operative position for engaging upon the tooth-shaped end of the small coin stop pawl and holding it in its said further elevated position when the latch lever is out of neutral position, an integral segmental wing on the pusher disc disposed and adapted for movement in a plane alongside said series of teeth, said wing having a perforation adjacent the leading end thereof adapted, during displacement of a coin from the coin arresting means by the pusher disc, to be moved to a common radial position with the end of the small coin stop pawl and a pin insertable in said perforation for contacting the small coin stop pawl during operation of the latch lever under the influence of a small diameter coin whereby further manual movement of the pusher disc is precluded and the disc is rendered inoperative to advance the indicator member to positions wherein the small coin stop pawl may cooperate with the several teeth on the ring.

8. In a coin controlled parking meter the combination of a settable indicator member yieldably returned to zero position in accordance with the passage of time, a spring returned manually operable pusher disc for engaging the indicator member and moving it away from zero position toward maximum setting position, an arcuate flange on the pusher disc, a ring having a series of teeth on its periphery and having a yieldable lost-motion connection with the indicator member, a small coin stop pawl having a pivotally mounted tooth-shaped end and yieldably urged to present its free end to the path of said teeth, a rockable latch lever yieldably urged to a neutral position wherein the end of the lever blocks the leading end of said arcuate flange against effective manual rotation of the pusher disc, means on said lever for arresting deposited coins of predetermined large and small diameters in the path of the pusher disc whereby the coins are displaced and the lever is rocked for distances differing with the diameters of the coins displaced, said arcuate flange, in the manually advanced position of the pusher disc, blocking return movement of the latch lever to neutral position, cooperating cam and pin means on the small coin stop pawl and latch lever whereby the latch lever in its neutral position holds said coin stop pawl above the path of the teeth on said ring and whereby movement of the latch lever under the influence of a small coin permits the small coin stop pawl to descend into the path of said teeth, greater movement of the latch lever under the influence of a predetermined large coin serving to further elevate the small coin stop pawl above its initial position, a pawl hook yieldably urged to operative position for engaging upon the tooth-shaped end of the small coin stop pawl and holding it in its said further elevated position when the latch lever is out of neutral position, a segmental wing on the pusher disc and operable relative thereto and in a plane alongside the teeth in said series prior to engagement of the pusher disc with the indicator member, said wing having a first perforation adjacent the leading end of the wing and further having a series of perforations beyond said first perforation and spaced apart in accordance with the spacing of the teeth on the ring and a pin selectively insertable in said first perforation and a selected perforation of said series of perforations, the location of said pin in said first perforation or one of said series of perforations selectively serving to prevent effective setting movement under the influence of a small coin and to exclude setting of the indicator member at a predetermined tooth corresponding numerically in the series with the location of the pin in the series of perforations.

9. In a parking meter mechanism the combination of a settable indicator yieldably urged to zero position in accordance with the passage of time, a manual member for setting the indicator away from zero position, a toothed member having limited lost motion connection with the indicator, a pawl adapted in one position to coact with the toothed member to permit stepwise setting movement of the indicator on successive operations of the manual member, a latch lever adapted to arrest a deposited coin in the path of the manual member for movement thereby, means on the latch lever for controlling the pawl in its coaction with the toothed member, and a pin adjustably insertable in the manual member for abutting the pawl on predetermined movement of the manual member, and selectively limiting the progressive coaction of the pawl member with the toothed member.

10. In a parking meter the combination of a settable indicator, a manual member for setting the indicator, a toothed member movable with the indicator, a pawl adapted to enter the path of the toothed member to provide stepwise setting movement of the indicator on successive operations of the manual member, a latch lever normally blocking movement of the manual member and adapted to arrest large and small coins in the path of the manual member for movement thereby and for causing the coins to move the latch lever out of blocking position for distances differing with the diameters of the coins so moved, said latch lever normally holding the pawl out of the path of the toothed member and on movement by a small coin serving to lower the pawl to the path of the toothed member, means operable on movement of the latch lever by a large coin to hold the pawl out of the path of the toothed member, and a pin selectively insertable in the manual member for engaging the pawl in its lowered position upon predetermined selected movement of the manual member, whereby advancement of the indicator by the use of small coins is selectively limited and advancement of the indicator by the use of large coins is permitted beyond said selected limit.

FRANK L. MICHAELS.

No references cited.